Figure 1:
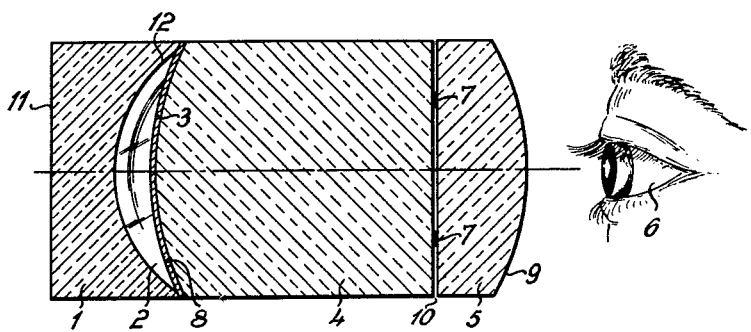

Feb. 2, 1960    F. PAPKE    2,923,196
PHOTOGRAPHIC VIEW FINDER
Filed Feb. 5, 1958

INVENTOR
FRIEDRICH PAPKE
BY Mocker Blum
ATTORNEYS

2,923,196
PHOTOGRAPHIC VIEW FINDER

Friedrich Papke, Braunschweig, Germany, assignor to Voigtlander A.G., Braunschweig, Germany, a corporation of Germany Application February 5, 1958, Serial No. 713,475

Claims priority, application Germany February 9, 1957

3 Claims. (Cl. 88—1.5)

This invention relates to photographic view finders and it has particular relation to view finders having a size reducing effect.

It has been known to provide photographic cameras with a Newton finder in which the object to be photographed appears as an image of reduced dimensions. Such finder contains on the side of the object a negative lens and on the eye side a positive lens. In order to produce a clear framing or edging of the image field in the finder, it has been suggested to design the Newton finder in such a manner that the finder be capable of reflecting a frame in accordance with the "Albada" principle. In such finders, the eye looks at the object through an arched partially permeable mirror which images at the same time a reflecting frame arranged at a suitable point of the finder space, for example in the focal plane of said mirror in about the infinite.

It has also been known to use the concave surface of the objective lens of the Newton finder simultaneously as a carrier for the partially permeable mirror of the frame to be reflected. It has also been suggested to divide the negative lens of the Newton finder into two negative lenses, in which one of the concave surfaces turned toward the eye is simultaneously the carrier of the partially permeable concave mirror. Finally, it has also been known to insert between the front lens and the ocular lens of the Newton finder a plane parallel glass block in order to modify the structural dimensions of said finder.

The finders constructed in accordance with the above-described suggestions were not entirely satisfactory in several respects. One disadvantage consisted in that disturbing reflections appear at the free-standing individual members of the finder. Furthermore, the reflecting layers of the partially permeable mirror and of the frame to be reflected, which are in contact with the air, are either not sufficiently protected from dust and other atmospheric influences or require the use of dust-proof casings or the like.

In order to avoid the before-mentioned and some additional disadvantages, it is contemplated according to the present invention to form the finder as a unitary block which does not need additional holding means for the individual members and therefore constitutes a structural unit as a whole and largely seals and thereby protects the surfaces carrying the mirror and the frame from exterior influences. Thereby the block finder according to the present invention is designed in such a manner that the concave surface of the front lens together with the spherical surface of the block cemented thereto, yields the refractive power for the Newton finder.

A glass block having plane parallel surfaces, inserted between the negative front lens and the positive ocular lens of a Newton finder, requires no change of the objective lens and the ocular lens in optical respect. It merely increases the overall length of the finder at an equal image angle and equal exit and entrance windows whereby its insertion in the camera cap is facilitated under certain conditions. If, however, a glass block having the before-mentioned features of the invention is inserted, i.e. a glass block which at least on the side turned toward the object has no plane surface and is designed with a convex surface, the refraction conditions must be modified if the principle of the Newton finder is supposed to be retained. The negative refractive power of the objective lens must be increased. This is attained according to the present invention by designing it in such a manner that the surface refractive power of the concave surface, which is turned toward the eye and arched in the direction of the object of the negative front lens of the system is, selected to be larger than the surface refractive power of the front surface (in the meaning of the direction of light) of the glass block which follows the front lens and is cemented to it at the edge, said surface being likewise arched toward the object, whereby these surface refractive powers yield together the negative refractive power which, by itself, together with the positive refractive power and the ocular lens, forms the system of the Newton finder. Thereby, simultaneously the partially permeable mirror is arranged in the vicinity of the negative front lens on the front surface of the glass block and the frame to be reflected is arranged on a cemented plane of division of said glass block, said plane of division being adjacent to the insight surface.

In carrying out the above described principle of construction, it is possible to change the design of the front lens. For example, the curvature of the concave hollow surface of the front lens can be reduced if its surface turned toward the object has a concave curvature. In order to reduce distortion, the surface of this front member turned toward the object can be also carried out with a convex curvature.

It has been found to be of advantage to carry out at the eye end of the finder a junction of the inserted glass block with the ocular lens of the finder so that from the ocular lens in fact only its insight surface turned toward the eye remains as an optically active element of the system. In practice, this can be done by cementing the ocular lens with the middle member so that the frame applied to one of the two parts is protected from damage by mechanical or chemical influences and, simultaneously, reflections which would appear on free-standing surfaces are reduced practically to zero. The design and location of the separating surface has no inuflence on the optical effect of the entire system as a Newton finder. Therefore, it can be designed and arranged in a manner which is most favorable for the respective purpose as a carrier surface for the frame to be reflected of the Albada finder, under the specific circumstances in the respective case.

The air lens which is formed in carrying into effect the above described principle, between the surface turned toward the eye, of the objective lens and the surface turned toward the object, of the subsequent body, has—in comparison with a complete cementing in of the mirror between two equally curved surfaces—the advantage that the high reflection is not reduced by cementing. This effect is of advantage particularly also in the use of non-absorbent individual or multiple layers.

The separating surface carrying the frame to be reflected can be a plane surface which is preferably perpendicular to the optical axis or it can be a concave surface of the block.

It has been found that a particularly practical embodiment of the finder according to the present invention is obtained by forming from three optical members a structural unit built in the following manner: a biconvex rear lens is cemented on the entire surface to the middle block, whereby the frame to be reflected is carried either by the cemented surface of the rear lens, or the corresponding surface of the middle block. The middle block is spherically arched on the surface turned toward the object and carries the partially permeable mirror coating, whereby the curvature of the arched surface is selected in such a manner that this partially permeable concave mirror, in combination with the reflecting surface turned toward the eye, of the rear lens, images the frame in about the infinite. To the before mentioned surface, which carries the partially permeable concave mirror, the front lens is cemented along the edge, whereby its concave surface turned toward the eye, encloses an air lens together with the middle block surface which carries the mirror.

This air lens is preferably dimensioned and arranged in such a manner, that the edges of one of its limiting surfaces project into the range of the lens located opposite this surface. Thus, for example, the edges of the rear surface of the front lens project into the range of the block, which has at these points cut off portions of corresponding curvature. The arrangement according to this suggestion can also be reversed.

The middle block may consist of a suitable light-permeable synthetic plastic material. If desired, other parts of the finder may likewise be made of synthetic plastic material.

The partially permeable mirror, as well as the reflecting frame are preferably made by deposition by vaporizing under vacuum.

In the above description reference has been made only to finders having an image-reducing effect, particularly to Newton finders. However, the present invention can be applied without particular difficulty, as an equivalent solution, in a corresponding manner also to finders with enlarging image formation, particularly to Galilei finders, in which the objective lens is arranged as a positive member and the ocular lens as a negative member.

The appended drawings illustrate by way of example some preferred embodiments of and some best modes for carrying out the invention, to which the invention is not limited.

In the drawings

Figure 2:
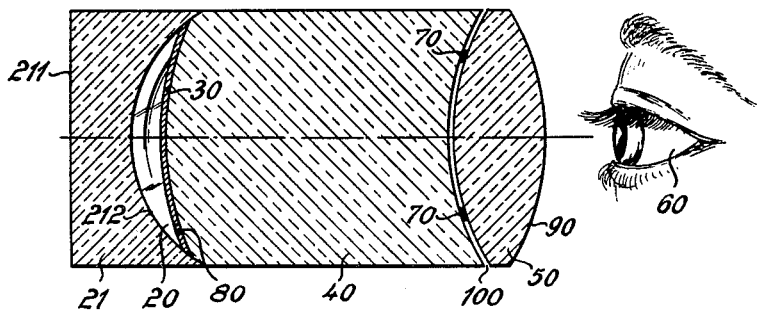

Fig. 1 diagrammatically illustrates one of the solutions available within the present invention, for the combination of a Newton finder with the Albada finder;

Fig. 2 illustrates a particularly advantageous structural form of the invention, it being understood that other structural forms can also be used in carrying out this invention.

Referring now to the drawings in detail, Fig. 1 illustrates a three-membered Newton finder according to the Albada principle for an enlarging ratio of 1:0.75 in block construction. In Fig. 1, reference symbol 1 denotes the negative front lens having a plane front surface 11 and an arched concave rear surface 12. The air lens is shown at 2, while the partially permeable mirror 3 is deposited by vaporizing on the front surface 8 of a glass block 4. The positive lens 5 is turned toward the eye 6. Members 1 and 4 which enclose the air lens, are connected preferably at the edge with each other. If the finder has a quadrangular cross-section, it is in most cases sufficient to carry out cementing at the four corners, or, if desired, at two of them. In the case of finders of round shape, the cementing surface would extend all around or would consist of two or more small cementing blocks. In the drawings, the cementing is not particularly shown. The cementing surface 10 between lenses 4 and 5 contains the reflecting frame 7. This frame is imaged by the above mentioned mirror 3, in cooperation with the refractive power of surface 9 turned toward the eye 6 of ocular lens 5, in about the infinite. Members 1 and 5 realize the principle of the Newton finder. The convex surface of glass block 4 serves as the carrier for the mirror. The air lens 2 is used in the structure shown in Fig. 1, in order to realize the negative refractive power necessary for the Newton finder, of the objective lens 1. The cementing surface 10 between lenses 4 and 5 is a plane surface in this example. The front surface 11 turned toward the object, of the negative lens 1 is a plane surface in the example illustrated in Fig. 1. However—in order to obtain particular optical effects—this surface could also have a concave or convex curvature. The concave surface turned toward the eye 6 should be provided with a correspondingly strong curvature.

The finder illustrated in Fig. 2 is built likewise of three parts. The negative front lens is shown at 21, a glass block at 40 and a lens turned toward the eye 60, at 50. Reference numeral 20 denotes an air lens located between members 21 and 40. The partially permeable mirror 30 is located on the spherical surface 80 turned toward the object, of block 40. The curvature of this surface is selected in such a manner that it images frame 70—which is located on one of the vicinal surfaces of members 40 and 50, which form the cemented layer 100 and are arched in the direction of the object—in cooperation with the refractive power of surface 90 of the ocular lens 50, at a great distance, preferably in about the infinite.

The curvatures of surface 80 on glass block 40, surface 212 on lens 21 and surface 90 on lens 50 are selected in such a manner, that the total optical system forms a finder of the Newton-structure. The front surface 211 of the system is here again a plane surface, which, however, could be arched too.

The first and last lens, i.e. 21 and 50, are not sufficient for forming a Newton-finder, because the refractive power of the lens 50 is higher than the refractive power of lens 21. The block 40 forms here a necessary part of the Newton-finder. Moreover, this block 40 having the radius 80, has simultaneously the function of carrying the mirror 30. While the block 40, on the one hand, partially cancels the refractive power of cementing surface 100, on the other hand, its surface 80 simultaneously reduces the refractive power of surface 212 of lens 21. By this reduction of the refractive powers of surfaces 212 and 100—said powers being intrinsically considerable—it is, in addition, in connection with the construction, possible to arrange, on the one hand, frame 70 on the curved rear surface and, on the other hand, the mirror 80 on the curved front surface of block 40. Both of these features are here used in order to meet the Albada-principle in a structurally rather simple manner.

In this connection, it is to be noted that in carrying out the present invention it should be endeavored to use for the mirror 80 a partially permeable, highly reflecting layer free from absorption. If a non-absorbing reflecting layer is cemented between two light permeable bodies, in most cases a considerable part of the reflection will be lost, which is undesirable. This is here avoided by means of air lens 20. However, to keep the disadvantages of a gap as small as possible, this air lens 20 is dimensioned and arranged in such a manner that the edges of its limiting surface which points toward the incidence of light, i.e. the edges of rear surface 212 of lens 21, project into the range of block 40. As can be seen from the drawing, the block 40 is cut off with corresponding curvatures at these points. By this procedure it is possible to keep the air gap 20 between lenses 21 and 40 relatively narrow and thus keep the reflections in tolerable limits, as well as to better protect mirror 80. According to a modified arrangement, block 40 could project into the lens 21. The thicker the lens 21 is, the smaller the air gap 20 can be kept under consideration of the optical conditions. If in the fundamental conception of the finder construction a thick lens 21 is assumed, then the present case of a combined Newton-Albada-finder it is even possible, without the danger of disturbing the finder image, for various applications—for example for the purpose of adaptation to a specific predetermined width of the camera cap—to shorten the finder in its overall length, by reducing the thickness of lens 21, without the necessity of changing other parts. The change of the finder image angle resulting herefrom is not objectionable, because it is neutralized by the frame present in unchanged size which indicates the correct image field.

The term "deposition by vaporization" and similar terms are used herein in connection with the frame in order to denote a procedure in which a metallic element e.g. aluminum, gold, etc. is vaporized under vacuum and the vapor is deposited on a surface to be coated, as far as the surface is not covered by templates which keep the surface uncoated in the portions covered by the template.

It will be understood from the above that this invention is not limited to the specific constructions, designs, elements, procedures, and other details specifically described above and illustrated in the drawings and can be carried out with various modifications within the scope of the invention as defined in the appended claims.

With regard to light permeable synthetic plastic materials as mentioned before the following examples are given:

(1) Polyvinylchloride
(2) Polystyrol
(3) Polymethyl-methacrylate

In the systems described above the following structural values are realised:

*Example 1 (Fig. 1)*

| Element | Radii | Thickness and Spaces | Refractive Indices |
|---|---|---|---|
| I | $R_1 = \infty$ | $d_1 = 3$ | $n_1 = 1.5233$ |
|   | $R_2 = 20.8$ | $s_2 = 2.4$ | |
| II | $R_3 = 61$ | $d_3 = 22.6$ | $n_2 = 1.5233$ |
|    | $R_4 = 88$ | $s_4 = 0$ | |
| III | $R_5 = 88$ | $d_5 = 3.3$ | $n_3 = 1.5233$ |
|     | $R_6 = 43$ | | |

*Example 2 (Fig. 2)*

| Element | Radii | Thickness and Spaces | Refractive Indices |
|---|---|---|---|
| I | $R_1 = \infty$ | $d_1 = 2$ | $n_1 = 1.5233$ |
|   | $R_2 = 16$ | $s_2 = 3.3$ | |
| II | $R_3 = 26$ | $d_3 = 10$ | $n_2 = 1.5233$ |
|    | $R_4 = \infty$ | $s_4 = 0$ | |
| III | $R_5 = \infty$ | $d_5 = 6$ | $n_3 = 1.5233$ |
|     | $R_6 = 52.2$ | | | wherein the values of radii, thickness and spaces are given in mm.

What is claimed is:

1. A photographic view finder having an image-reducing effect and comprising in combination a front lens member of negative refractive power, turned toward the object, an ocular lens member of positive refractive power, turned toward the eye, a transparent intermediate member arranged between said front member and ocular member, a frame and a semi-permeable mirror for reflecting said frame into the image field; said ocular member consisting of a biconvex lens, the inner surface of which is cemented over the entire surface to the adjacent rear surface of the intermediate member; the frame to be reflected being arranged in about the focal plane of said mirror, in said cemented surface; the front surface of the intermediate member curved toward the object being spherically curved; said means for reflecting the frame consisting of a partially permeable hollow mirror being arranged on the front surface of the intermediate member and the curvature of said front surface being selected in such a manner that said hollow mirror, together with the outer surface of the ocular lens member images the frame at about infinity; said front lens having a concave inner surface which is arched toward the object and cemented at the edge to said front surface of the intermediate member and forms an air lens with said front surface, whereby the refractive power of the first lens member is split into a negative refractive power and a positive refractive power, by selecting the surface refractive power of said inner surface of the front lens, higher than the surface refractive power of said front surface of the intermediate member, and these surface refractive powers yield together the negative refractive power which, in combination with the positive refractive power of the ocular lens, form a system of the Newton viewfinder type.

2. A view finder as claimed in claim 1, in which the air lens is dimensioned and arranged in such a manner, that the edges of one of its limiting surfaces project into the range of the lens located opposite said one limiting surface.

3. A view finder as claimed in claim 2, in which the edges of the rear surface of the front lens project into the range of the intermediate member, which is provided with cut off portions of suitable curvature at the respective points.

References Cited in the file of this patent

UNITED STATES PATENTS

| 1,985,067 | Wandersleb | Dec. 18, 1934 |
| 2,633,051 | Davis | Mar. 31, 1953 |

FOREIGN PATENTS

| 269,447 | Germany | Jan. 22, 1914 |
| 558,417 | Germany | Sept. 7, 1932 |
| 521,679 | Great Britain | May 28, 1940 |
| 996,990 | France | Sept. 5, 1951 |
| 1,007,969 | France | Feb. 13, 1952 |
| 1,025,524 | France | Jan. 21, 1953 |